Figure 1:
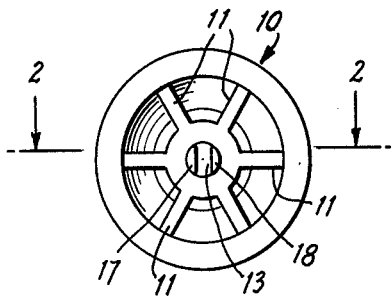

Nov. 24, 1964 M. MARX 3,158,058
STUD RIVETS
Filed Sept. 14, 1961

INVENTOR.
MARTIN MARX
BY Edward Thomas
ATTORNEY

United States Patent Office 3,158,058
Patented Nov. 24, 1964

3,158,058
STUD RIVETS
Martin Marx, 14 Briarcliff Drive, Monsey, N.Y.
Filed Sept. 14, 1961, Ser. No. 138,121
2 Claims. (Cl. 85—38)

This invention relates to stud rivets which, in one form, are widely used on the bottom face of luggage containers to take part of the wear of those bottoms.

In the forms hitherto used the rivet includes a dome-shaped metal body provided with a circular opening at the crest of the dome and an almost flat-headed metal rivet seats itself in a shallow depression around the opening with its long longitudinally split shank projecting inward through the opening.

The stud rivet thus marketed is, for economic reasons, available only in two colors, viz., nickel and brass, and, since the rivets are made and inserted by automatic machinery, the rivet shanks have to be firmly inserted permanently in the dome openings by automatic machinery.

It is impossible, satisfactorily, to coat the domes with special color to harmonize with the color of the luggage. The coating and drying is expensive and is rapidly marred by scratches of the luggage in its usual rough handling.

According to the present invention the rivet dome is molded from a suitable plastic in the form of a relatively thick-walled dome strengthened by internal radial partitions which unite near the center to form a tube, surrounding the metal shank of the rivet.

The plastic may be molded of any desired solid color to harmonize with luggage to which it is applied, and the molded body preferably is semi-rigid, somewhat resilient and tough enough to withstand the hammer blow of automatic riveting in clinching the split arms of the shank.

The head of the metal rivet is slightly domed and thick enough to fit into a central depression in the top of the dome, continuing by its outer surface the curvature of the dome, and taking any wear caused by sliding the luggage across a rough surface.

Thus the metal fabric of the rivet is an integral domed head on the end of a split shank. The shank is preferably roughened or knurled near its head to seize the inner walls of the central tube and hold the metal shank in place after once assembled so that the shank is firmly held during further operations.

The internal partitions are shown in a dome spanning ⅞ inch as terminating short of the place of the edge of the dome by about ¹⁄₁₆ inch, thus facilitating the compression of the dome during the clinching of the rivet.

The best material for the dome and its integral parts seems to approximate the resiliency and hardness of some rubber tire treads used on automobile tires.

The most satisfactory plastic composition for commercially producing the dome seems to be semi-rigid polyethylene molded at 400° F. to make a highly tough rubber-like mass slightly resilient under thumb-nail pressure.

Other features and advantages will hereinafter appear.

Figure 2:
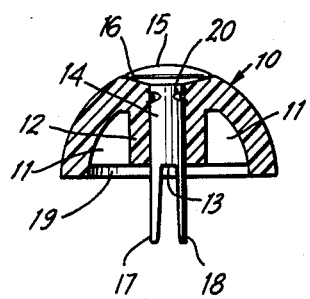

In the accompanying drawing:
FIG. 1 shows the interior of the stud rivet viewed from the bottom.
FIG. 2 is a sectional side view of the same on the line 2—2 of FIG. 1.

In the drawings the rivet stud shown includes a hollow dome-shaped body 10 of conventional tough sheet resilient polyethylene with six internal radial partitions 11 which are thinner than the body 10 and merge at the center into a thicker walled tube 12. From the tube 12 projects the split body 13 of the metal rivet 14 having a round head 15 which is also rounded at the hollow to fit a slight rounded depression 16 in the apex of the dome 10.

The body 13 is shown as split into two prongs 17 and 18 at the bottom of the tube so they spread when driven home in luggage and clinched by the usual automatic riveting machine.

To permit the riveting to be tight the partitions 11 and tube 12 are shown as terminating about ¹⁄₁₆ inch short of the bottom edge 19 of the dome 10.

The metal rivet head and shank may be one piece suitable metal inserted after the dome body and parts 10 have been molded. The shank is knurled as by gashes 20 with turned up edges which catch on the tube 12 and hold the metal rivet in place once the automatic assembling machine has assembled the device.

Polyethylene seems superior to polystyrene in that it is absolutely free from cracking and like it may be molded in any solid and permanent color and has all the advantage of rubber mixes like the toughness and resilience and non-shattering quality of tire tread rubber mixes, and is more readily shaped into small parts.

Such a satisfactory product was obtained by heating M8 semi-rigid polyethylene powder at 400° F. for 30 seconds in a multiple unit mold under a pressure of 600 lbs. per square inch, and cooling by water circulated through the mold.

Having thus described one form of the invention, what is claimed is:

1. A dome-shaped stud consisting of a semi-rigid hollow polyethylene body wall, integral circumferentially spaced radial partitions in said dome and extending to the wall of said dome and thinner than the dome body wall, a central tube having a wall in which said partitions terminate, said tube and partitions terminating substantially coextensively near but short of the base of said dome, and a metal rivet having a head lying in a depression on said wall and the top surface of said head being curved to form a continuation of said dome wall, said rivet having a body in said tube and split prongs projecting beyond the tube and wall, and a projection on said shank tending to hold it in the tube.

2. A dome-shaped stud consisting of a semi-rigid hollow polyethylene body wall, integral circumferentially spaced radial partitions in said dome and extending to the wall of said dome and thinner than the dome body wall, a central tube having a wall in which said partitions terminate, said tube and partitions terminating substantially coextensively near but short of the base of said dome and a metal rivet having a head lying in a depression on said wall and the top surface of said head being curved to form a continuation of said dome wall, said rivet having a body in said tube and split prongs projecting beyond the tube and wall, and means integral to said shank tending to hold it in the tube.

References Cited in the file of this patent
UNITED STATES PATENTS

| | | |
|---|---|---|
| 438,371 | Ells | Oct. 14, 1890 |
| 586,452 | Norman et al. | July 13, 1897 |
| 641,956 | Hart | Jan. 23, 1900 |
| 821,397 | Bartel | May 22, 1906 |
| 951,997 | Simpson | Mar. 15, 1910 |
| 2,718,943 | Braverman | Sept. 27, 1955 |